United States Patent
Berthoud et al.

(10) Patent No.: US 10,316,113 B2
(45) Date of Patent: Jun. 11, 2019

(54) CATALYST SYSTEM

(71) Applicant: ARLANXEO NETHERLANDS B.V., Geleen (NL)

(72) Inventors: Alexandra Berthoud, Neerharen (BE); Gerardus Henricus Josephus Van Doremaele, Munstergeleen (NL); Richard Thomas William Scott, Brentwood Essex (GB); Francisco Perez, Maastricht (NL); Raffaele Bernardo, Maastricht (NL)

(73) Assignee: ARLANXEO NETHERLANDS B.V., Geleen (NL)

( * ) Notice: Subject to any disclaimer, the term of this patent is extended or adjusted under 35 U.S.C. 154(b) by 0 days.

(21) Appl. No.: 15/751,616

(22) PCT Filed: Aug. 8, 2016

(86) PCT No.: PCT/EP2016/068835
§ 371 (c)(1),
(2) Date: Feb. 9, 2018

(87) PCT Pub. No.: WO2017/029141
PCT Pub. Date: Feb. 23, 2017

(65) Prior Publication Data
US 2018/0237553 A1    Aug. 23, 2018

(30) Foreign Application Priority Data
Aug. 14, 2015 (EP) .................................... 15181095

(51) Int. Cl.
*C08F 4/6592* (2006.01)
*C08F 4/02* (2006.01)
*C08F 210/18* (2006.01)
*B01J 31/22* (2006.01)
*C08F 210/06* (2006.01)
*C08F 236/20* (2006.01)

(52) U.S. Cl.
CPC ......... *C08F 4/6592* (2013.01); *B01J 31/2295* (2013.01); *C08F 4/027* (2013.01); *C08F 210/06* (2013.01); *C08F 210/18* (2013.01); *C08F 236/20* (2013.01); *B01J 2231/12* (2013.01); *C08F 4/65925* (2013.01); *C08F 2420/03* (2013.01); *C08F 2420/04* (2013.01); *C08F 2500/03* (2013.01)

(58) Field of Classification Search
CPC .... C08F 4/027; C08F 4/6592; C08F 4/65912; C08F 4/65916; C08F 210/18
See application file for complete search history.

(56) References Cited

U.S. PATENT DOCUMENTS

| | | |
|---|---|---|
| 6,468,936 B1 | 10/2002 | Reddy et al. |
| 6,858,558 B2 | 2/2005 | Kretschmer |
| 8,729,206 B2 | 5/2014 | Resconi et al. |
| 9,340,630 B2 * | 5/2016 | Kaji .................... C08F 4/65912 |
| 9,862,736 B2 | 1/2018 | Berthoud et al. |
| 2009/0012246 A1 * | 1/2009 | Ijpeij ...................... C08F 10/00 526/98 |
| 2011/0282017 A1 | 11/2011 | Kaji et al. |

FOREIGN PATENT DOCUMENTS

| | | |
|---|---|---|
| JP | 2004-518782 A | 6/2004 |
| WO | 2010055652 A1 | 5/2010 |
| WO | 2013146337 A1 | 10/2013 |

OTHER PUBLICATIONS

Severn, John R. et al., "Immobilisation of homogeneous olefin polymerisation catalysts, Factors influencing activity and stability", Dalton Transactions, 2013, 42, The Royal Society of Chemistry, pp. 8979-8987.
Chen, Eugene You-Xian, et al., "Cocatalysts for Metal-Catalyzed Olefin Polymrization: Activators, Activation Processes, and Structure-Activity Relationships", Chem. Rev., 2000, 100, American Chemical Society, pp. 1391-1434.
European Search Report from corresponding European Application No. 15181095, dated Feb. 8, 2016, three pages.
Office Action for JP Patent Application No. 2018-507511 dated Jan. 11, 2019 with English translation.

* cited by examiner

*Primary Examiner* — Caixia Lu
(74) *Attorney, Agent, or Firm* — Pepper Hamilton LLP

(57) ABSTRACT

A catalyst system comprising a supported catalyst containing a) a solid support, which is a solid methylaluminoxane composition wherein: i) the aluminum content is in the range of 36 to 41 wt % and ii) the mole fraction of methyl groups derived from the trimethylaluminum component relative to the total number of moles of methyl groups is 12 mol % or lower and b) a catalyst thereon which is a metal complex of the formula (1) CyLMZ$_p$ (1), wherein M is titanium Z is an anionic ligand, p is number of 1 to 2, preferably 2, Cy is a cyclopentadienyl-type ligand and L is an amidinate ligand of the formula (2) wherein the amidine-containing ligand is covalently bonded to the metal M via the imine nitrogen atom, and Sub1 is a substituent comprising a group 14 atom through which Sub1 is bonded to the imine carbon atom and Sub2 is a substituent comprising a heteroatom of group, through which Sub2 is bonded to the imine carbon atom.

(2)

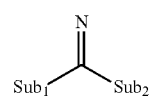

20 Claims, No Drawings

CATALYST SYSTEM

The present invention relates to a new catalyst system, containing a certain supported catalyst, a process for its manufacturing, a polymerization process using the same as well as the polymers obtained therefrom.

A process for the polymerization of at least one olefin having 2 to 8 carbon atoms in the presence of a polymerization catalyst component comprising an amidine ligand, an activator, and optionally a scavenger is known from WO2005090418. WO2005090418 discloses a process for the copolymerization of ethylene and at least one additional alpha olefin having from 3 to 8 carbon atoms. Characterized in that said process is a catalyst system for olefin polymerization comprising an organometallic complex of a group 4 metal comprising an amidine ligand; and an activator. WO2005090418 discloses also a process for the copolymerisation of ethylene, alpha olefin and one or more non conjugated dienes. The catalyst system as exemplified in WO'418 is its unsupported homogenous nature. Use of such a catalyst system in gas-phase or slurry (suspension) EPDM processes can be problematic due to reactor fouling.

The benefits of catalysts on solid supports are well known in the art in terms of diminished reactor fouling since a supported catalyst provides a degree of control over catalyst particle size. However, it also well-known that a supported catalyst results in loss of productivity relative to the performance of the unsupported catalyst (Dalton Trans., 2013, 42, 8979). Conventional supporting materials typically require an inorganic carrier such as silica, a magnesium halide which have disadvantages due to the number of steps required (which typically include preparation of the silica, treatment of the silica with alkyl aluminium species, contact of the support with metal complex as well as copious washing procedures for each step) and the resulting chemical complexity of the final supported catalyst. The use of an inorganic carrier also ultimately results in increased inorganic contamination of the final product.

Supported catalysts on solid alkyl aluminoxanes have been demonstrated, such as in U.S. Pat. No. 6,468,936 B1, but the supporting process is complicated and requires several steps whilst offering poor control of features of the supported catalyst such as particle size distribution and morphology.

Control over the particle size is especially advantageous in controlling features of the polymerisation such as activity and fouling behaviour.

More recently, U.S. Pat. No. 8,729,206 describes a process of metallocenes on solid methylaluminoxanes and explains that control of particle size is possible.

A controlled means of preparing solid methyl aluminoxanes (MAO) is known from US2011/0282017A1. Even though, for certain catalysts such supported catalyst can show some effects the level of performance still needs to be further improved.

The object of this invention is to provide an improved supported catalyst that can be used even at elevated temperatures (≥90° C.) with activities matching the corresponding unsupported catalysts. Furthermore, an object of the invention is that this effect can be achieved without requirement for a pre-polymerisation step. Also advantageously is a low aluminium(support):titanium ratio. In addition, the supported catalyst shall not result in undesirable reduction of comonomer/non-conjugated diene incorporation.

DETAILS OF THE INVENTION

This objective is achieved with a catalyst system comprising a supported catalyst containing a) a solid support, which is a solid methylaluminoxane composition wherein:
   i) the aluminum content is in the range of 36 to 41 wt % and
   ii) the mole fraction of methyl groups derived from the trimethylaluminum component relative to the total number of moles of methyl groups is 12 mol % or lower and
b) a catalyst thereon which is a metal complex of the formula (1)

$$CyLMZ_p \qquad (1),$$

wherein
M is titanium
Z is an anionic ligand,
p is number of 1 to 2, preferably 2,
Cy is a cyclopentadienyl-type ligand and
L is an amidinate ligand of the formula (2)

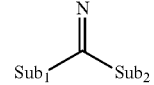

(2)

wherein the amidine-containing ligand is covalently bonded to the metal M via the imine nitrogen atom, and Sub1 is a substituent comprising a group 14 atom through which Sub1 is bonded to the imine carbon atom and Sub2 is a substituent comprising a heteroatom of group 15, through which Sub2 is bonded to the imine carbon atom.

a) Solid Support

To the extent not explicitly mentioned herein, with regard to the solid methylaluminoxane composition, the preferred embodiments, its manufacturing and measurement methods US 2011/028017 A1 shall hereby be incorporated by reference, in particular paragraphs [0048] to [0066]. The aluminium content of 36 to 41 wt % is based on the solid methylaluminoxane composition.

The solid methylaluminoxane is normally made from trimethylaluminium. Preferably the solid methylaluminoxane composition having a particulate form with a volume-based median diameter falling within a range of 1 to 50 μm, more preferably from 1 to 20 μm, more preferably 1 to 10 μm and most preferably from 1 to 7 μm.

Also preferred is the solid methylaluminoxane composition having a solubility in n-hexane at 25° C. of 0 to 2 mol %, and having a solubility in toluene at 25° C. of 0 to 2 mol %. Preferred is also the supported catalyst to have these solubility properties.

Furthermore a preferred solid methylaluminoxane composition having a homogeneity denoted by the following equation is 0.45 or lower:

Homogeneity:Σ(SIGMA)$X_i$|d(0.5)−$D_i$|/d(0.5)/Σ(SIGMA)$X_i$ wherein $X_i$ denotes the histogram value of the ith particle, d(0.5) denotes the median diameter based on volume, and $D_i$ denotes the diameter based on volume of the ith particle.

Another preferred solid methylaluminoxane composition having a specific surface area falling within a range of 10 to 25 m²/mmol Al (BET (N$_2$) isotherm).

Preferably the solid methylaluminoxane composition having a pore volume falling within a range of 0.1 to 1.0 m²/g (BET (N$_2$) isotherm).

Also preferred is the solid methylaluminoxane composition comprising methylaluminoxane (MAO) containing the unit denoted by general formula:

-[(Me)AlO]$_n$— and trimethylaluminum, wherein n denotes an integer of from 10 to 50.

The phrase "containing the unit" means that it contains methylaluminoxane in which n denotes a single number falling within the above range (n being a specified integer) or contains multiple polymethylaluminoxanes of multiple types (n denoting multiple different integers) including chains and cyclic species.

The above given preferred embodiments can also be used in combination with each other.

Particularly preferred is the supported catalyst having a molar ratio Al(support):Ti of 10 to 2000. More preferably from 10 to 500 and most preferably from 50 to 200.

b) Metal Complex

Cy

As used herein, the term substituted cyclopentadienyl-type ligand is meant to broadly convey its conventional meaning, namely a substituted ligand having a five-membered carbon ring which is bonded to the metal via a π-type bonding usually in adopting η5-coordination to the metal.

A preferred cyclopentadienyl-type ligand is mono or polysubstituted wherein the substituents are selected from the group consisting of halogen, substituted or unsubstituted hydrocarbyl, substituted or unsubstituted hydrocarbyloxy, substituted or unsubstituted silyl and substituted or unsubstituted germyl residues as well as amido and phosphide radicals. Possible substituents are halogen, amido, phosphido, alkoxy, or aryloxy residues.

Thus, the term cyclopentadienyl-type includes cyclopentadienyl, indenyl and fluorenyl. The term mono- or polysubstituted refers to the fact that one or more aromatic hydrogen atoms of the cyclopentadienyl-type structure have been replaced by one or more other residues. The number of substituents is preferably between 1 and 5 for the cyclopentadienyl ligand, preferably 1 to 7 for the indenyl ligand and 1 to 9 for the fluorenyl ligand.

An exemplary list of substituents for a cyclopentadienyl ligand includes the following groups. For halogens F, Cl and Br may be mentioned.

For substituted or unsubstituted hydrocarbyl radicals are preferred including $C_1$-$C_{20}$ linear and branched alkyl radicals such as methyl, ethyl, propyl, butyl, pentyl, hexyl, heptyl, octyl, nonyl, and decyl, $C_1$-$C_{20}$ hydrocarbyl-substituted and unsubstituted cyclic aliphatic and polycyclic aliphatic radicals such as cyclopropyl, cyclobutyl, cyclopentyl, cyclohexyl, phenylcyclohexyl, methylcyclohexyl, cycloheptyl, cyclooctyl, cyclodecyl, cyclododecyl, isopropyldodecyl, adamantyl, norbornyl, tricyclo[5.2.1.0]decyl; $C_1$-$C_{20}$ hydrocarbyl-substituted and unsubstituted aryl radicals including phenyl, methylphenyl, trimethylphenyl, cyclohexylphenyl, napthyl, butylphenyl, butyldimethylphenyl; $C_{1-20}$ substituted hydrocarbyl radicals including benzyl, N,N-dimethylaminobenzyl, N,N-dimethylaminomethyl, methoxymethyl, diphenylphosphinomethyl, fluorophenyl, trifluoromethylphenyl, fluoromethyl and cyanoethyl.

The preferred substituted or unsubstituted silyl and substituted or unsubstituted germyl residues include Si—($R^6$)$_3$ wherein each $R^6$ is selected from the group consisting of hydrogen, $C_{1-8}$ alkyl or alkoxy radical, $C_{6-10}$ aryl or aryloxy.

The preferred substituted or unsubstituted hydrocarbyloxy radicals include methoxy, ethoxy, butoxy, phenoxy, methylthio, ethylthio and phenylthio.

The preferred amido and phosphido radicals include an amido which is unsubstituted or substituted by up to two $C_{1-8}$ alkyl radicals, and a phosphido radical which is unsubstituted or substituted by up to two $C_{1-8}$ alkyl radicals.

In a preferred embodiment the cyclopentadienyl ligand is penta substituted by methyl groups and in consequence Cy is 1,2,3,4,5-pentamethyl-cyclopentadienyl, C5Me5, commonly referred to as Cp*. Also preferred ligands Cy are other unsubstituted or substituted cyclopentadienyl groups, substituted or unsubstituted indenyl groups, substituted or unsubstituted fluorenyl groups, substituted or unsubstituted tetrahydroindenyl groups, substituted or unsubstituted tetrahydrofluorenyl groups, substituted or unsubstituted octahydrofluorenyl groups, substituted or unsubstituted benzoindenyl groups, substituted or unsubstituted heterocyclopentadienyl groups, substituted or unsubstituted heteroindenyl groups, substituted or unsubstituted heterofluorenyl groups, or their isomers.

Z

In a preferred embodiment Z independently means a halogen atom, a $C_{1-10}$ alkyl group, a $C_{7-20}$ aralkyl group, a $C_{6-20}$ aryl group or a $C_{1-20}$ hydrocarbon-substituted amino group, and more preferably, a halogen atom and a $C_{1-10}$ alkyl group, most preferably Cl, F, Br, methyl, benzyl, methyltrimethylsilyl, phenyl, methoxyphenyl, dimethoxyphenyl, N,N-dimethylaminophenyl, bis-(N,N-dimethylamino)phenyl, fluorophenyl, difluorophenyl, trifluorophenyl, tetrafluorophenyl, perfluorophenyl, trialkylsilylphenyl, bis(trialkylsilyl)phenyl and tris(trialkylsilyl)phenyl. Most preferred are methyl and benzyl. In case Z is a dianionic ligand p is 1 and in case Z is a monoionic ligand p is 2. For the latter case, the given meanings for Z are independent. Preferably p=2 and both Z are identical.

In a preferred embodiment Z is selected from the group consisting of $C_1$-$C_4$-alkyl and $C_{7-20}$ aralkyl group, preferably methyl.

L

A preferred embodiment of the invention relates to the metal complex of the formula (1) containing an amidine-containing ligand L of formula (2) wherein Sub1 is an aryl residue that may be substituted or unsubstituted. Typical examples for such a preferred amidinate-containing ligand are represented by formula (2) with Sub1 being a phenyl or substituted phenyl residue, preferable naphthyl, 2,6-dimethylphenyl, 2,6-dichlorophenyl or 2,6-difluorophenyl.

A further embodiment of the invention relates to a metal complex of formula (1) having an L of the formula (2), wherein Sub1 is an alkyl residue. Typical examples for such a preferred Sub1 are linear, branched or cyclic alkyl residue with 1 to 20 carbon atoms, unsubstituted or substituted with halogen, amido, silyl or aryl radicals. Examples for such Sub1 are methyl, hexyl, cyclohexyl, iso-propyl, tert-butyl, benzyl, trifluoromethyl, 2,6-dimethyl benzyl, 2,6-difluoro benzyl and 2,6-difluoro benzyl.

Another preferred embodiment of the present invention relates to a metal complex of the formula (1) having an L of the formula (2), wherein Sub2 is of the general formula —NR$^4$R$^5$ with R$^4$ and R$^5$ being individually selected from the group of aliphatic hydrocarbyl, halogenated aliphatic hydrocarbyl, aromatic hydrocarbyl and halogenated aromatic hydrocarbonyl residues. R$^4$ optionally forming a heterocyclic structure with R$^5$ or Sub1. Examples for Sub2 are dimethylamide, diisopropylamide and biscyclohexyl amide. Most preferred examples of the amidinate-containing ligand represented by the formula (2) are based on protio-amidines of the formula (2a)

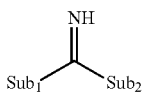

(2a)

Examples include N,N-dimethylacetimidamide, N,N-diisopropylacetimidamide, N,N-dicyclohexylacetimidamide, N-(2,6-dimethylphenyl)-N-ethylacetimidamide, N,N-dimethylisobutyrimidamide, N,N-diisopropylisobutyrimidamide, N, N-dicyclohexyl-isobutyrimidamide, N-(2,6-dimethylphenyl)-N-ethylisobutyrimidamide, N,N-dimethylcyclohexanecarboximidamide, N,N-diisopropylcyclohexanecarboximidamide, N,N-dicyclohexylcyclohexanecarboximidamide, N-(2,6-dimethylphenyl)-N-ethylcyclohexane-carboximidamide, N,N-dimethylpivalimidamide, N,N-diisopropylpivalimidamide, N,N-dicyclohexylpivalimidamide, N-(2,6-dimethylphenyl)-N-ethylpivalimidamide, 2,2,2-trifluoro-N,N-dimethylacetimidamide, 2,2,2-trifluoro-N,N-diisopropylacetimidamide, N,N-dicyclohexyl-2,2,2-trifluoroacetimidamide, N-(2,6-d imethylphenyl)-N-ethyl-2,2,2-trifluoroacetimidamide, 2-(phenyl)-N,N-dimethylacetimidamide, 2-(phenyl)-N,N-diisopropylacetimidamide, N,N-dicyclohexyl-2-(phenyl)acetimidamide, 2-(phenyl)-N-(2,6-dimethylphenyl)-N-ethylacetimidamide, 2-(2,6-dimethylphenyl)-N,N-dimethylacetimidamide, 2-(2,6-dimethylphenyl)-N,N-diisopropylacetimidamide, N,N-dicyclo-hexyl-2-(2,6-dimethylphenyl)acetimidamide, N,2-bis(2,6-dimethylphenyl)-N-ethylacet-imidamide, 2-(2,6-difluorophenyl)-N,N-dimethylacetimidamide, 2-(2,6-difluorophenyl)-N,N-diisopropylacetimidamide, N,N-dicyclohexyl-2-(2,6-difluorophenyl)acetimidamide, 2-(2,6-difluorophenyl)-N-(2,6-dimethylphenyl)-N-ethyl-acetimidamide, N,N-dimethyl-benzimidamide, N,N-diisopropylbenzimidamide, N,N-dicyclohexylbenzimidamide, N-(2,6-dimethylphenyl)-N-ethylbenzimidamide, N,N-dimethyl-1-naphthimidamide, N,N-diisopropyl-1-naphthimidamide, N,N-dicyclohexyl-1-naphthimidamide, N-(2,6-dimethylphenyl)-N-ethyl-1-naphthimidamide, N,N,2,6-tetra-methylbenzimidamide, N,N-diisopropyl-2,6-dimethylbenzimidamide, N,N-dicyclohexyl-2,6-dimethylbenzimidamide, N-(2,6-dimethylphenyl)-N-ethyl-2,6-dimethylbenz-imidamide, 2,6-difluoro-N,N-dimethyl-benzimidamide, 2,6-difluoro-N,N-diisopropylbenzimidamide, N, N-dicyclohexyl-2,6-difluorobenzimidamide, N-(2,6-dimethylphenyl)-N-ethyl-2,6-difluorobenzimidamide, 2,6-dichloro-N,N-dimethylbenzimidamide, 2,6-dichloro-N,N-diisopropylbenzimidamide, 2,6-dichloro-N,N-dicyclohexylbenzimidamide, 2,6-dichloro-N-(2,6-dimethylphenyl)-N-ethyl-benzimidamide. Preferred examples are 2,6-difluoro-N,N-piperidinylbenzamidine, 2,4-difluoro-N,N-diisopropylbenz-imidamide (2,4-difluoro-N,N-diisopropylbenzamidine), 2,4,6-trifluoro-N,N-diisopropylbenz-imidamide (2,4,6-trifluoro-N,N-diisopropyl-benz-amidine), 3,5-difluoro-N,N-diisopropylbenz-imidamide (3,5-difluoro-N,N-diisopropyl-benzamidine), pentafluoro-N,N-diisopropylbenz-imidamide (pentafluoro-N,N-diisopropylbenzamidine), 2,6-difluoro-N,N-diisopropylbenz-imidamide (2,6-difluoro-N,N-diisopropylbenzamidine) and N,N-diisopropylbenzimidamide (N,N-diisopropyl-benzamidine).

Another preferred embodiment of the present invention relates to a metal complex of the formula (1) having a ligand L of the formula (2b)

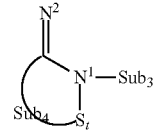

(2b)

wherein the amidine-containing ligand is covalently bonded to the metal M via the imine nitrogen atom $N^2$; S is a —$CH_2$— unit, and t is the integer number denoting the number of S and is in the range of 1-4, more preferably in the range of 1-2, most preferably is 1;

Sub3 is an aliphatic or aromatic cyclic or linear substituent comprising a group 14 atom through which Sub3 is bonded to the amine nitrogen atom $N^1$;

Sub4 is an optionally substituted C2 unit in which the 2 carbon atoms may be $sp^2$ or $sp^3$ hybridized.

A preferred embodiment of the invention relates to a metal complex of formula 1 wherein Sub3 is an alkyl, alkenyl, alkynyl with 1 to 20 carbon atoms or aromatic residue with 6 to 20 carbon atoms, which are in each case unsubstituted or substituted with halogen, amido, silyl or aryl radicals. Examples for such Sub3 are methyl, n-propyl, i-propyl, tert-butyl, pentyl, cyclopentyl, hexyl, cyclohexyl, heptyl, cycloheptyl, octyl, cyclooctyl, cyclododecyl, octadecyl, adamantly, 1-butenyl, 2-butenyl and propenyl, unsubstituted phenyl or substituted phenyl residue, preferably phenyl, naphthyl, 2,6-dimethylphenyl, 2,6-dichlorophenyl or 2,6-difluorophenyl.

A preferred embodiment of the invention relates to a metal complex of formula 1 wherein L of the formula 2b) has the general formula 2c)

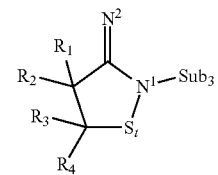

(2c)

wherein $R_1$-$R_4$ are the same or different and each represents a hydrogen atom, a halogen atom, an optionally substituted C1-10 alkyl group or an optionally substituted C1-10 alkoxy group, and S, t and Sub3 have the above mentioned meaning, or L of the formula 2b) has the general formula 2d)

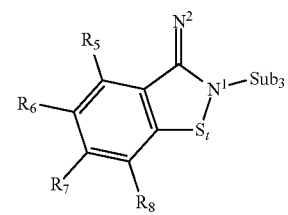

(2d)

wherein $R_5$-$R_8$ are the same or different and each represents a hydrogen atom, a halogen atom, an optionally substituted 01-10 alkyl group, an optionally substituted C1-10 alkoxy group, or the adjacent $R_5$-$R_8$ may be linked to form an aromatic ring optionally substituted, preferably unsubstituted, and S, t and Sub3 have the above mentioned meaning. Typical examples for preferred $R_5$-$R_8$ are hydrogen and fluorine.

In a preferred embodiment, in which L has the general form 2c) with $R_1$-$R_4$ each representing a hydrogen atom or 2d) with $R_5$-$R_8$ each representing a hydrogen atom or $R_5$ being a fluorine atom and with Sub3 being methyl, n-propyl, i-propyl, tert-butyl, pentyl, cyclopentyl, hexyl, cyclohexyl, heptyl, cycloheptyl, octyl, cyclooctyl, cyclododecyl, octadecyl, adamantly, 1-butenyl, 2-butenyl, propenyl, phenyl, naphthyl, 2,6-dimethylphenyl, 2,6-dichlorophenyl or 2,6-difluorophenyl, S means $CH_2$ and t is 1.

In a preferred embodiment the catalyst system according to the present invention contains a metal complex of formula (1), wherein
M is Ti,
Z is selected from the group consisting of $C_1$-$C_4$-alkyl or a $C_{7\text{-}20}$ aralkyl group, preferably methyl,
p is 2
Cy is pentamethylcyclopentadienyl ligand and
L means N,N-diisopropylbenzamidinate or 2,6-difluoro-N,N-diisopropylbenzamidinate.

c) Scavenger

The catalyst system of the present invention may in addition to he supported catalyst contain a scavenger c). A scavenger is a compound that reacts with impurities present in the process of the invention, which are poisonous to the catalyst.

In a preferred embodiment of the present invention the scavenger c) as of the catalyst system is a hydrocarbyl of a metal or metalloid of group 1-13 and/or its reaction products with at least one sterically hindered compound containing a group 15 or 16 atom.

Preferably, the group 15 or 16 atom of the sterically hindered compound bears a proton. Examples of these sterically hindered compounds are tert-butanol, iso-propanol, triphenylcarbinol, 2,6-di-tert-butylphenol, 4-methyl-2,6-di-tert-butylphenol, 4-ethyl-2,6-di-tert-butylphenol, 2,6-di-tert-butylanilin, 4-methyl-2,6-di-tert-butylanilin, 4-ethyl-2,6-di-tert-butylanilin, HMDS (hexamethyldisilazane), diisopropylamine, di-tert-butylamine, diphenylamine and the like. Some non-limiting examples of scavengers are butyllithium including its isomers, dihydrocarbylmagnesium, and hydrocarbylzinc and their reaction products with a sterically hindered compound or an acid, such as HF, HCl, HBr, HI. Preferable scavenger systems comprise a soluble, non-supporting aluminium alkyl compound in combination with a sterically hindered phenolic compound. Preferably the aluminium alkyl scavenger is triisobutylaluminium (TIBA) in combination with a hindered phenolic compound. The ratio between aluminium alkyl and hindered phenolic compound is preferably between 1:0.1 and 1:10, more preferably between 1:0.5 and 1:5, most preferably between 1:1 and 1:2. Preferably the aluminium alkyl is triisobutylaluminium (TIBA) and the sterically hindered phenolic compound is 4-methyl-2,6-di-tert-butylphenol.

The scavenger can also be an organoaluminum compound (E1) which is a soluble and non-supporting aluminum compound having a carbon-aluminum bond, and represented by the general formula $T^1{}_a AlZ_{3-a}$ (wherein, each of $T^1$ is hydrocarbon group, and all $T^1$ may be the same or different respectively. Z represents a hydrogen atom or halogen atom, and all Z's may be the same or different. 'a' represents a number satisfying $0<a\leq 3$, 'b' is an integer of 2 or more, and 'c' is an integer of 1 or more.).

The hydrocarbon group in E1 is preferably a hydrocarbon group having 1 to 8 carbon atoms, and more preferably an alkyl group.

Specific examples of the soluble (and non-supporting) organoaluminum compound (E1) represented by the general formula $T^1{}_a AlZ_{3-a}$ include trialkylaluminums such as trimethylaluminum, triethyl-aluminum, tripropylaluminum, triisobutylaluminum, trihexylaluminum and the like; dialkylaluminum chlorides such as dimethylaluminum chloride, diethylaluminum chloride, dipropylaluminum chloride, diisobutylaluminum chloride, dihexylaluminum chloride and the like; alkylaluminum dichlorides such as methylaluminum dichloride, ethylaluminum dichloride, propylaluminum dichloride, isobutylaluminum dichloride, hexylaluminum dichloride and the like; dialkylaluminum hydrides such as dimethylaluminum hydride, diethylaluminum hydride, dipropylaluminum hydride, diisobutylaluminum hydride, dihexylaluminum hydride and the like; and so forth. Preferably triisobutylaluminium is employed as a scavenger (c) in combination with 4-methyl-2,6-di-tert-butylphenol.

If a scavenger is used, the molar ratio of metal complex (1):scavenger c) employed preferably ranges from 0.1:1000 to 0.1:1, more preferably ranges from 0.1:1000 to 0.1:300.

d) Secondary Activator

The support used for the catalyst carrier of the present invention may also work as activator, so that no additional or co-catalyst needs to be added. However, such a "secondary activator" may nevertheless be used in addition. Preferably the secondary activator d) is different from the solid support a).

A secondary activator of the component d) for single-site catalysts are fairly well known in the art. These activators often comprise a group 13 atom, such as boron or aluminium. Examples of these activators are described in Chem. Rev., 2000, 100, 1391 by E. Y-X. Chen and T. J. Marks. A preferred activator b) is a borane (C1), a borate (C2, C3) or an organoaluminum compound (E2) and/or (E3) like a soluble (non-supporting) alkylaluminoxane such as soluble methyl aluminoxane (MAO). The activator for activation preferably is any boron compound of the following (C1) to (C3) and/or an organoaluminum compound (E; see above).

The organoaluminum compound (E2) and (E3) which are soluble and non-supporting aluminum compounds having a carbon-aluminum bond, and one or more of aluminum compounds:

(E2) is a cyclic aluminoxane having a structure represented by the general formula $\{-Al(T^2)-O-\}_b$ (E3) is a linear aluminoxane having a structure represented by the general formula $T^3\{-Al(T^3)-O-\}_c AlT^3{}_2$ (wherein, each of $T^2$ and $T^3$ is hydrocarbon group, and all $T^2$ and all $T^3$ may be the same or different respectively. Z represents a hydrogen atom or halogen atom, and all Z's may be the same or different. 'a' represents a number satisfying $0<a\leq 3$, 'b' is an integer of 2 or more, and 'c' is an integer of 1 or more.).

The hydrocarbon group in E2 or E3 is preferably a hydrocarbon group having 1 to 8 carbon atoms, and more preferably an alkyl group.

Specific examples of soluble (and non-supporting) cyclic aluminoxane E2 having a structure represented by the general formula $\{-Al(T^2)-O-\}_b$ and the soluble linear aluminoxane E3 having a structure represented by the general formula $T^3\{-Al(T^3)-O-\}_c AlT^3{}_2$ include alkyl groups such as a methyl group, ethyl group, n-propyl group, isopropyl group, n-butyl group, isobutyl group, n-pentyl group, neopentyl group and the like. b is an integer of 2 or more, c is an integer of 1 or more. Preferably, $T^2$ and $T^3$ represent a methyl group or isobutyl group, and b is 2 to 40 and c is 1 to 40.

The above-described soluble (and non-supporting) aluminoxane is made by various methods. This method is not particularly restricted, and the aluminoxane may be produced according to a known method. For example, a solution prepared by dissolving a trialkylaluminum (for example, trimethylaluminum and the like) in a suitable organic solvent (benzene, an aliphatic hydrocarbon or the like) is allowed to contact with water to produce aluminoxane. Further, there is exemplified a method in which Ia trialkylaluminum (for example, trimethylaluminum and the like) is allowed to contact with a metal salt containing crystal water (for example, copper sulfate hydrate and the like) to produce aluminoxane.

Boron-containing optional secondary activators:
(C1) A boron compound represented by the general formula $BQ_1Q_2Q_3$
(C2) A boron compound represented by the general formula $G(BQ_1Q_2Q_3Q_4)$
(C3) A boron compound represented by the general formula $(J-H)(BQ_1Q_2Q_3Q_4)$ $Q_1$ to $Q_3$ are a halogen atom, hydrocarbon group, halogenated hydrocarbon group, substituted silyl group, alkoxy group or di-substituted amino group, and they may be the same or different. $Q_1$ to $Q_3$ are preferably a halogen atom, hydrocarbon group having 1 to 20 carbon atoms, halogenated hydrocarbon group having 1 to 20 carbon atoms, substituted silyl group having 1 to 20 carbon atoms, alkoxy group having 1 to 20 carbon atoms or amino group having 2 to 20 carbon atoms, and more preferably, $Q_1$ to $Q_3$ are a halogen atom, hydrocarbon group having 1 to 20 carbon atoms, or halogenated hydrocarbon group having 1 to 20 carbon atoms. Further preferably, $Q_1$ to $Q_3$ are a fluorinated hydrocarbon group having 1 to 20 carbon atoms containing at least one fluorine atom, and particularly preferably, $Q_1$ to $Q_3$ are a fluorinated aryl group having 6 to 20 carbon atoms containing at least one fluorine atom. $Q_4$ has the same meaning as one of the radicals $Q_1$ to $Q_3$ and $Q_1$ to $Q_4$ may be the same or different. G is an inorganic or organic cation, J is a neutral Lewis base, and (J-H) is a Bronsted acid.

In the boron compound (C1) represented by the general formula $BQ_1Q_2Q_3$, B is a boron atom in the trivalent valence state, $Q_1$ to $Q_3$ have the above mentioned meanings and may be the same or different.

Specific examples of the compound (C1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, phenyl-bis(pentafluoro-phenyl)borane and the like, and tris(pentafluorophenyl)borane is most preferable.

In the boron compound (C2) represented by the general formula $G(BQ_1Q_2Q_3Q_4)$, $G^+$ is an inorganic or organic cation, B is a boron atom in the trivalent valence state, and $Q_1$ to $Q_4$ are as defined for $Q_1$ to $Q_3$ in the above-mentioned (C1).

Specific examples of the inorganic cation G in a compound represented by the general formula $G(BQ_1Q_2Q_3Q_4)$ include a ferrocenium cation, alkyl-substituted ferrocenium cation, silver cation and the like, specific examples of the organic cation G thereof include a triphenylmethyl cation and the like. G is preferably a carbenium cation, and particularly preferably a triphenylmethyl cation.

Examples of (B $Q_1Q_2Q_3Q_4$) include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, teterakis(2,3,4-trifluorophenyl)borate, phenyltris(pentafluoro-phenyl) borate, tetrakis(3,5-bistrifluoromethylphenyl)borate and the like.

As specific combination of them, ferroceniumtetrakis(pentafluorophenyl)borate, 1,1'-dimethylferroceniumtetrakis(pentafluorophenyl)borate, silvertetrakis(pentafluorophenyl)borate, triphenylmethyltetrakis-(pentafluorophenyl)borate, triphenylmethyl-tetrakis(3,5-bistrifluoromethylphenyl)borate and the like are listed, and triphenylmethyltetrakis(pentafluorophenyl)borate is most preferable.

In the boron compound (C3) represented by the general formula $(J-H)^+(BQ_1Q_2Q_3Q_4)$, J is a neutral Lewis base, (J-H) is a Bronsted acid, B is a boron atom in the trivalent valence state, and $Q_1$ to $Q_4$ are as defined for $Q_1$ to $Q_4$ in the above-mentioned Lewis acid (C1).

Specific examples of the Bronsted acid $(J-H)^+$ in a compound represented by the general formula (J-H)$(BQ_1Q_2Q_3Q_4)$ include a trialkyl-substituted ammonium, N,N-dialkylanilinium, dialkylammonium, triaryl phosphonium and the like, and as the $(BQ_1Q_2Q_3Q_4)$, the same compounds as described above are listed. As specific combination of them, there are listed triethylammoniumtetrakis(pentafluoro-phenyl)-borate, tripropylammoniumtetrakis(pentafluorophenyl)borate, tri(n-butyl)ammonium-tetrakis(pentafluorophenyl)borate, tri(n-butyl)ammoniumtetrakis(3,5-bistrifluoromethyl-phenyl)borate, N,N-dimethylaniliniumtetrakis(pentafluoro-phenyl)borate, N,N-diethylaniliniumtetrakis(penta-fluorophenyl)borate, N,N-2,4,6-pentamethylanilinium-tetrakis(pentafluorophenyl)borate, N,N-dimethylanilinium-tetrakis(3,5-bistrifluoromethyl-phenyl)borate, diisopropyl-ammoniumtetrakis(penta-fluorophenyl)borate, dicyclohexyl-ammoniumtetrakis-(pentafluorophenyl)borate, triphenylphosphoniumtetrakis(penta-fluorophenyl)borate, tri(methylphenyl)phosphoniumtetrakis(pentafluorophenyl)borate, tri(dimethylphenyl)-phosphonium-tetrakis(pentafluorophenyl)borate and the like, and tri(n-butyl)ammonium-tetrakis(pentafluorophenyl)borate or N,N-dimethylaniliniumtetra-kis(pentafluoro-phenyl)borate is most preferable.

If there is any secondary activator d) used, the molar ratio of metal complex of the formula (1): secondary activator d), in particular of the type C1-C3 employed preferably ranges from 1:10 to 2:0, more preferably ranges from 1:5 to 1:0, and most preferably from 1:3 to 1:1.

Process

The invention further relates to a process for the manufacturing of the catalyst system according to present invention wherein the solid support a) is contacted with the catalyst b). Preferably the solid support a) is employed as a suspension in an aliphatic and/or aromatic hydrocarbon solvent and contacted with the complex of formula 1) preferably neat or as a solution in an aliphatic and/or aromatic hydrocarbon solvent. Non-limiting examples of solvents are hexanes, toluene, decane and the like. The contacting preliminary may take place in the range of −80° C. up to the boiling point of the solvent. Preferably the contacting takes place at 0 to 25° C. and at ambient pressure, preferably at 0.9 bar to 1.1 bar. Preferably, the reaction is carried out under an atmosphere of a dry, inert gas such as nitrogen. Stirring (magnetic or otherwise) is not employed due to potential attrition of the support particles hence gentle agitation/shaking is preferred. Post contacting washing steps may optionally be employed using an aliphatic and/or aromatic hydrocarbon solvent such as hexanes, toluene, decane and the like.

The optional component c) and/or d) may be added during or after the preparation of the supported catalyst or may be added separately as part of the catalyst system to the polymerization step.

Polymerization

The invention further provides a process for the polymerization of a polymer by polymerizing at least one olefinic monomer comprising contacting said monomer with the catalyst system of the present invention.

The preferred process for polymerization is generally concluded by consulting at least one olefinic monomer with the catalyst system according to the present invention in the gas phase, in slurry, or in solution in an inert solvent preferable a hydrocarbon solvent. Preferably the polymerization is conducted in slurry, or in solution in an inert solvent preferable a hydrocarbon solvent. Suitable solvents are in the gas phase, in slurry, or in solution in an inert solvent preferable a hydrocarbon solvent. Suitable solvents are a $C_{5-12}$ hydrocarbon such as propane, butane, pentane, hexane, heptane, octane, isomers and mixtures thereof, cyclohexane, methylcyclohexane, pentamethyl heptane and hydrogenated naphtha. The process of the invention may be conducted at temperatures from 10 to 250° C., depending on the product being made. Most preferably the slurry EPDM polymerization is performed at temperatures from 10 to 65° C. Most preferably the solution EPDM polymerization is performed at temperatures greater than 80° C.

Monomer Definition

An olefinic monomer is understood to be a molecule containing at least one polymerizable double bond.

Suitable olefinic monomers are $C_{2-20}$ olefins. Preferred monomers include ethylene and $C_{3-12}$ alpha olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, and $C_{4-12}$ straight chained or cyclic hydrocarbyl radicals which are unsubstituted or substituted by a $C_{1-4}$ alkyl radical. Illustrative non-limiting examples of such a-olefins are propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hepta-decene, 1-octadecene, 1-nonadecene, 1-eicosene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene and 12-ethyl-1-tetradecene. These a-olefins may be used in combination.

The monomer may also be a polyene comprising at least two double bonds. The double bonds may be conjugated or non-conjugated in chains, ring systems or combinations thereof, and they may be endocyclic and/or exocyclic and may have different amounts and types of substituents. This means that the polyene may comprise at least one aliphatic, alicyclic or aromatic group, or combinations thereof.

Suitable polyenes include aliphatic polyenes and alicyclic polyenes. More specifically, aliphatic polyenes can be mentioned, such as 1,4-hexadiene, 3-methyl-1,4-hexadiene, 4-methyl-1,4-hexadiene, 5-methyl-1,4-hexadiene, 4-ethyl-1,4-hexadiene, 1,5-hexadiene, 3-methyl-1,5-hexadiene, 3,3-dimethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 1,6-heptadiene, 1,6-octadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 1,6-octadiene, 6-methyl-1,6-octadiene, 7-methyl-1,6-octadiene, 6-ethyl-1,6-octadiene, 6-propyl-1,6-octadiene, 6-butyl-1,6-octadiene, 1,7-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 1,8-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 1,9-decadiene, 1,5,9-decatriene, 6-methyl-1,6-undecadiene, 9-methyl-1,8-undecadiene and 1,13-tetradecadiene, 1,3-butadiene, isoprene.

Alicyclic polyenes may consist of at least one cyclic fragment. Examples of these alicyclic polyenes are vinylcyclohexene, vinylnorbornene, ethylidene norbornene, dicyclopentadiene, cyclooctadiene, 2,5-norbornadiene, 1,4-divinylcyclohexane, 1,3-divinylcyclohexane, 1,3-divinylcyclopentane, 1,5-divinylcyclooctane, 1-allyl-4-vinylcyclo-hexane, 1,4-diallylcyclohexane, 1-allyl-5-vinylcycloocatane, 1,5-diallylcyclooctane, 1-allyl-4-isopropenylcyclohexane, 1-isopropenyl-4-vinylcyclohexane and 1-isopropenyl-3-vinylcyclopentane, and 1,4-cyclohexadiene. Preferred polyenes are polyenes having at least one endocyclic double bond and optionally at least one exocyclic double bond, such as 5-methylene-2-norbornene and 5-ethylidene-2-norbornene, 5-vinylnorbornene, and 2,5-norbornadiene, dicyclopentadiene and vinylcyclohexene.

Examples of aromatic polyenes are divinylbenzene (including its isomers), trivinyl-benzene (including its isomers) and vinylisopropenylbenzene (including its isomers).

All of the above-mentioned monomers may be further substituted with at least one group comprising a heteroatom of group 13-17, or combinations thereof.

Homopolymers, copolymers and copolymers on the basis of 3 or more of the above-mentioned olefinic monomers and also blends thereof can be prepared with the process of the present invention.

In a preferred embodiment copolymers on the basis of ethylene, at least one $C_{3-12}$ alpha olefin, preferably propylene and at least one non-conjugated diene, preferably a diene selected from the group consisting of 5-methylene-2-norbornene 5-ethylidene-2-norbornene, 5-vinylnorbornene, 2,5-norbornadiene, dicyclopentadiene (DCPD) and vinylcyclohexene, preferably from the group consisting of 5-ethylidene-2-norbornene and 5-vinylnorbornene are made with metal complex of the present invention.

The invention further relates to polymers obtainable with the metal complex of the present invention or the catalyst system of the present invention. Below, the invention will be elucidated on the basis of the following examples and comparative experiments, without being limited thereto.

The present invention also relates to polymers obtainable with the catalyst system according to the present invention or the polymerization process of the present invention.

EXAMPLES

Test Methods.
Size Exclusion Chromatography with IR detector (SEC-IR)
Equipment: Freeslate Rapid GPC system
  with single detection (Infrared detector IR4 Standalone by Polymer Char)
Columns: PLGel Mixed-B 10 μm (x3 300×7.5 mm columns)
Calibration: Calibration with linear polystyrene (PS) standards
  (molecular weight ca. 30-3000 kg/mol)
Temperature: 160° C.
Flow: 1.5 ml/min
Injection volume: 125 μl
Solvent/eluent: Distilled 1,2,4-trichlorobenzene with 0.4 g/l of BHT stabilizer
Sample preparation: Dissolving for 2 hours at approx. 160° C.
  Filtration through 2 and 0.5 micron sintered glass filter
  Sample concentration 1.5 mg/ml Fourier transformation infrared spectroscopy (FT-IR), was used to determine the composition of the copolymers according to the method that is known in the art. The FT-IR measurement gives the composition of the various monomers in weight percents relative to the total composition.

Composition was determined using mid-range FT-IR spectroscopy (in the cases of Table 1 using polymer samples deposited on gold-coated silicon wafers).

Part I Preparation of Supported Catalysts

Supported Cat 1.

To a toluene suspension of an solid MAO made according to the embodiment 7 of US2011/0282017 (55 mL, 0.55 M Al) was added a toluene (0.2 mL) solution of $Me_5CpTiMe_2$ $(NC(2,6-C_6H_3F_2)(^iPr_2N))$ (Cat.1, known from WO2005090418 as compound 10M; 0.092 g, 0.20 mmol). After approximately one minute, the previously colorless material observed collecting towards the bottom of the toluene suspension had turned yellow/orange. The suspension was gently agitated for 16 h by shaking of the flask. Following 16 h, the solid component of the suspension had turned a dark brown/red colour. The toluene was then carefully decanted away from the settled material using a 0.2 micron glass fibre filter canula and the settled solid material carefully washed with toluene (2×10 mL) and hexanes (2×10 mL). For each wash, at least 30 minutes was required for the solid to settle before each decantation. Care was taken not to lose material on the filter. The final suspension was prepared by addition of toluene (50 mL) to give a suspension of concentration 4 mM of Ti (based on complete activation/adsorption of $Me_5CpTiMe_2(NC(2,6-C_6H_3F_2)$ $(^iPr_2N))$. It was observed that agitation of the slurry resulted in a suspension which could be easily manipulated/transferred. After being stationary for ca 2 minutes, the particles began to settle again. ICP-AES analysis revealed a Ti content of the slurry of 204 mg/Kg (corresponding to 4 mM). The Al content of the slurry was 1.86 wt.% resulting in a molar [Al]:[Ti] of 162.

Supported Cat. 2

$(nBuCp)_2ZrCl_2$ (Cat. 2; purchased from Boulder Scientific Co.) was supported using the same protocol. ICP-AES analysis revealed a Zr content of the slurry of 421 mg/Kg (corresponding to 4 mM). The Al content of the slurry was 1.10 wt.% resulting in a molar [Al]:[Zr] of 90.

Supported Cat. 2b $(nBuCp)_2ZrCl_2$ (Cat. 2) was supported using the same protocol. ICP-AES analysis revealed a Zr content of the slurry of 13 mg/Kg (corresponding to 0.3 mM). The Al content of the slurry was 3.74 wt.% resulting in a molar [Al]:[Zr] of 9700.

Supported Cat. 2M $(nBuCp)_2ZrMe_2$ (Cat. 2M; known from Journal of Organometallic Chemistry 714 (2012) 32-40 as Compound 3) was supported using the same protocol. ICP-AES analysis revealed a Zr content of the slurry of 431 mg/Kg (corresponding to 4 mM). The Al content of the slurry was 0.58 wt.% resulting in a molar [Al]:[Zr] of 46.

Part II—EPDM Solution Co-Polymerizations (Table 1)

The polymerizations with the in situ-generated catalysts were carried out in 48 parallel pressure reactors (PPR48). The PPR reactor cells were fitted with a pre-weighed glass vial insert and a disposable stirring paddle. The reactors were sealed, tested with Nitrogen at 130 psi to ensure that leaks not higher than 0.1 psi min$^{-1}$ may occur. The reactor atmosphere was then purged three times with propene at 80 psi, and 3.9 mL of toluene was added (toluene is purified by passing through MBraun SPS mixed bed columns), along with an ENB/TIBA/BHT (Examples 1, Comp. 3, 4 and 6) or ENB/MMAO-3A/BHT (Comp. Examples 2 and 7) toluene solution with the following composition: ENB (Sigma Aldrich, used as received,5% v/v) 34 mM (final reactor concentration), TIBA (AKZO NOBEL) (Examples 1, Comp. 3, 4 and 6) or MMAO-3A (Comp. Examples 2 and 7) and BHT (Sigma Aldrich, used as received). In the case of Example 5, a toluene solution of ENB (only) was added: 34 mM (final reactor concentration).

The liquid reactants were injected into each cell through a valve. The reactors were heated at 40° C. and the cells pressurized with 50 psi of propylene (Linde Gas, further purified through Selexorb and BASF catalysts for Oxygen and moisture removal) for 5 minutes with a stirring speed of the paddles of 800 rpm. After pressure stabilization, the reactors were heated at the polymerization temperature (90° C.) and the reactors were then left to equilibrate for 30 minutes. The reactors were then pressurized with ethylene until a final pressure of 130 psi is reached. The catalysts (supported-catalyst (Example 1) and unsupported (Comparison Example 2) was were injected into the cells as a toluene suspension (Examples 1, Comp. 4-6) or a toluene solution (Comp. 2 and 7).

The catalyst loading is adjusted such that the dosing is high enough that sufficient polymer is prepared to be characterized and low enough that not so much polymer is made that reactor mass transport limitations are encountered: 0.004 to 0.080 μmol of Ti or Zr. The total [Al]:[Ti] or [Zr] ratio was fixed for all experiments except Comp. 5 to a value of 1000. This total value includes support material (if present) and TIBA or MMAO-3A (Comp. 2 and 7). Comp. 5 employed a [Al]:[Zr] ratio of 5000 and the aluminium present was solely from the support material. The [BHT]:[Al] ratio was fixed at 2 for all experiments except Comp. 5 in which no BHT was used. The polymerizations were run at constant temperature and ethylene partial pressure for 5 minutes, then quenched with an oxygen/nitrogen mixture (2%Oxygen content v/v) at 50 psi (3.4 bar) overpressure. The reactors were then cooled, vented and purged with $N_2$, in order to prevent the glove box pollution from the quenching gas. After purging with inert gas, the reactors were opened and the glass inserts are unloaded from the cells, transferred to the centrifuge/vacuum drying station (Genevac EZ-2 Plus) and the volatiles were removed under reduced pressure overnight. The polymer samples were then weighed on a Weighing Station unit and the polymer yields are recorded. The polymers were analysed for molecular weight and Mw/Mn (SEC-IR) and composition (FT-IR) ported Cat 1). Note that Example 3 demonstrates that the TIBA/BHT scavenger system does not activate Cat 1 (Un-

TABLE 1

| Ex. No | Catalyst | Activator | [Support Al]:[Ti]/or [Zr] | Total [Al]:[Ti] or [Zr] | No. of replicate expts | Average Polymer Yield mg | Average Productivity[1] ppm Ti or Zr | No. used for polymer analysis | Average C2 incorp. Wt. % | Average ENB incorp. Wt. % | Average Mw Kg/mol | Mw/Mn |
|---|---|---|---|---|---|---|---|---|---|---|---|---|
| 1 | Supported Cat 1 | — | 162 | 1000 | 38 | 228 | 2 | 37 | 32.6 | 5.0 | 344 | 2.1 |
| Comp. 2 | Unsupported Cat 1 | MMAO-3A | — | 1000 | 6 | 134 | 2 | 6 | 34.3 | 4.5 | 528 | 2.2 |
| Comp. 3 | Unsupported Cat 1 | — | — | 1000 | 3 | 1.5 | | Insufficient polymer to analyze | | | | |
| Comp. 4 | Supported Cat 2 | — | 90 | 1000 | 9 | 47 | 156 | 8 | 65.3 | 3.9 | 190 | 8.2 |
| Comp. 5 | Supported Cat 2b | — | 9700 | 9700 | 14 | 112 | 8 | 14 | 69.9 | 4.6 | 58 | 3.3 |
| Comp. 6 | Supported Cat 2M | — | 46 | 1000 | 8 | 112 | 65 | 8 | 73.0 | 4.0 | 81 | 3.3 |
| Comp. 7 | Unsupported Cat 2M | MMAO-3A | — | 1000 | 6 | 134 | 55 | 6 | 62.8 | 4.3 | 77 | 3.2 |

[1]Calculated value: (mass of Ti or Zr dosed/polymer yield) * 1000000

Part III—Slurry EPDM Co-polymerizations

Inventive Example 8

A 2L reactor was heated to 60° C., while stirring at 1500 rpm and, under an inert atmosphere of nitrogen, was filled with butane (550 g), propylene (28 g), ENB (2.5 mL), TIBA (4 mL, 0.1 M in hexanes) and BHT (2 mL, 0.2 M in hexanes).

The reactor was heated to 60° C., while stirring at 1500 rpm. The reactor was pressurized to 10 bar with ethylene, and the suspended catalyst (1.5 μmol) was injected into the reactor. During reaction, the pressure in the reactor was kept constant by a mixture of ethylene, propylene, ENB and hydrogen set to recipe ratio.

After completion of reaction, the contents of the reactor were dumped into a secondary vessel containing iso-propanol, while maintaining pressure in the reactor with nitrogen. After degassing and stirring for 5 minutes, the killing vessel was emptied, and the polymer was recovered by mesh filtration.

To remove polymer which remained in the reactor, the reactor was filled with pentamethylheptane (PMH) and stirred overnight at 130° C. The mixture was carefully collected, and concentrated in vacuo.

The total polymer yield was 39.68 g (1.8 ppm Ti). This polymer had a composition of 61.5 wt % C2, 34.4 wt % C3, and 4.1 wt % ENB, the molecular weight measured by SEC-IR was 1496 kgmol$^{-1}$, Mw/Mn=1.9.

Conclusion

The units for productivity (ppm M; M=Ti or Zr) denote the (calculated) residual catalytic metal in the polymer derived from the polymer yield and catalyst dosing. Hence the smaller this value, the more productive the catalyst.

The inventive supported catalyst (Supported Cat 1) is highly active in both small scale solution (Table 1) and up-scaled slurry (Example 8) EPDM polymerizations. It may be seen that the catalyst is similarly active (same productivity in ppm Ti) to the unsupported version (Unsupported). TIBA/BHT is a non-activating scavenger system employed in this case. The polymer produced by Supported Cat 1 (Example 1) and Unsupported Cat 1 (Comp. 2) has similar composition (C2, ENB wt. %)

The inventive catalyst (Supported Cat 1) is more productive (ppm M; M=Ti or Zr) than the catalysts employed in the other comparative examples (Comp. 4-7). Supported Cat 2M is less productive than Unsupported Cat 2M which is consistent with the general knowledge concerning supporting/immobilizing molecular catalysts.

Supported Cat 2 ([Support Al]:[Zr]=90) is even less productive than Supported Cat 2M ([Support Al]:[Zr]=46) in spite of the higher [Support Al]:[Zr] ratio.

Increasing the [Support Al]:[Zr] ratio to the disadvantageously high levels (the order of 10^3) known from US2011/0282017A1 ([Al]:[Zr]=5000) results in better productivity for Supported Cat 2b. However, the productivity is still not as high as the inventive example. In practice, use of such high [Al]:[Zr] (≥5000) levels would make the supported catalyst both more hazardous to handle and more costly.

Furthermore, the molecular weight of the polymer prepared with Supported Cat 2b (Comp.5) is also much lower than the inventive supported catalyst Supported Cat 1. Similarly Supported Cat. 2 and 2M produce lower molecular weight polymer than Supported Cat 1.

The invention claimed is:

1. A catalyst system comprising a supported catalyst, the supported catalyst comprising:
   a) a solid support comprising a solid methylaluminoxane composition having:
      i) an aluminum content of 36 to 41 wt %; and
      ii) a mole fraction of methyl groups derived from the trimethylaluminum component relative to the total number of moles of methyl groups of 12 mol % or lower; and
   b) a catalyst thereon comprising a metal complex of the formula (1)

$$CyLMZ_p \qquad (1),$$

wherein
M is titanium,
Z is an anionic ligand,
p is number of 1 to 2,
Cy is a cyclopentadienyl-type ligand, and
L is an amidinate ligand of the formula (2)

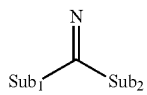 (2)

wherein the amidine-containing ligand is covalently bonded to the metal M via the imine nitrogen atom, and Sub1 is a substituent comprising a group 14 atom through which Sub1 is bonded to the imine carbon atom, and Sub2 is a substituent comprising a heteroatom of group 15 through which Sub2 is bonded to the imine carbon atom.

2. The catalyst system according to claim 1, wherein the solid methylaluminoxane composition has a particulate form with a volume-based median diameter of 1 to 50 μm.

3. The catalyst system according to claim 1, wherein the solid methylaluminoxane composition has a homogeneity of 0.45 or tower as denoted by the following equation:

Homogeneity=Σ(SIGMA)$Xi|d(0.5)-Di|/d(0.5)$Σ(SIGMA)$Xi$ wherein Xi denotes the histogram value of a particle i, d(0.5) denotes the median diameter based on volume, and Di denotes the diameter based on volume of particle i.

4. The catalyst system according to claim 1, wherein the solid methylaluminoxane composition has a specific surface area of 10 to 25 $m^2$/mmol-Al.

5. The catalyst system according to claim 1, wherein the solid methylaluminoxane composition comprises polymethylaluminoxane containing the unit denoted by general formula (I) below and trimethylaluminum:

-[(Me)AlO]n- (I)

wherein n denotes an integer of 10 to 50.

6. The catalyst system according to claim 1, further comprising a scavenger c).

7. The catalyst system according to claim 1, further comprising an activator d) other than the solid support of the component a).

8. The catalyst system according to claim 1, wherein Z is selected from the group consisting of $C_1$-$C_4$-alkyl and $C_{7-20}$ aralkyl group, preferably methyl.

9. The catalyst system according to claim 1, wherein:
M is Ti,
Z is selected from the group consisting of $C_1$-$C_4$-alkyl or a $C_{7-20}$ aralkyl group,
p is 2,
Cy is pentamethylcyclopentadienyl ligand, and
L means N,N-diisopropylbenzamidinate or 2,6-difluoro-N,N-diisopropylbenzamidinate.

10. A process for manufacturing the catalyst system according to claim 1, the process comprising contacting the solid support a) with the catalyst b).

11. A process for the preparation of a polymer, the process comprising polymerizing at least one olefinic monomer by contacting the monomer with the catalyst system according to claim 1.

12. The process according to claim 11, wherein the olefinic monomers comprise ethylene and at least a $C_3$-$C_{12}$-α-olefin.

13. The process according to claim 11, wherein the olefinic monomers comprise ethylene, at least one $C_{3-12}$alpha olefin, and at least one non-conjugated diene.

14. Polymers obtained by the process according to claim 11.

15. The process according to claim 11, wherein the olefinic monomers comprise ethylene, at least one $C_{3-12}$alpha olefin, and at least one non-conjugated diene selected from the group consisting of 5-methylene-2-norbornene 5-ethylidene-2-norbornene, 5-vinylnorbornene, 2,5-norbornadiene, dicyclopentadiene and vinylcyclohexene.

16. The process according to claim 11, wherein the olefinic monomers comprise ethylene, at least one $C_{3-12}$alpha olefin, and at least one non-conjugated diene selected from the group consisting of 5-ethylidene-2-norbornene and 5-vinylnorbornene.

17. The catalyst according to claim 1, wherein the supported catalyst has a molar ratio Al(support):Ti(catalyst) of 10 to 2000.

18. The catalyst according to claim 1, wherein:
the solid methylaluminoxane composition comprises polymethylaluminoxane containing the unit denoted by general formula (I) below and trimethylaluminum:

-[(Me)AlO]n- (I)

wherein n denotes an integer of 10 to 50; and
the solid methylaluminoxane composition has:
a particulate form with a volume-based median diameter of 1 to 50 μm;
a homogeneity of 0.45 or lower as denoted by the following equation Homogeneity=Σ(SIGMA)$Xi|d(0.5)-Di|/d(0.5)$Σ(SIGMA)$Xi$ wherein Xi denotes the histogram value of a particle i, d(0.5) denotes the median diameter based on volume, and Di denotes the diameter based on volume of particle i;
a specific surface area of 10 to 25 $m^2$/mmol-Al; and
a pore volume of 0.1 to 1.0 $m^2$/g (BET ($N_2$) isotherm).

19. The catalyst according to claim 18, wherein:
the volume-based median diameter is 1 to 20 μm; and
Z is selected from the group consisting of $C_1$-$C_4$-alkyl and $C_{7-20}$ aralkyl group.

20. The catalyst according to claim 19, wherein:
in formula (1):
M is Ti,
Z is methyl,
p is 2,
Cy is pentamethylcyclopentadienyl ligand, and
L is N,N-diisopropylbenzamidinate or 2,6-difluoro-N, N-diisopropylbenzamidinate,
the molar ratio Al(support):Ti(catalyst) is 10 to 500;
the volume-based median diameter is 1 to 7 μm; and
the catalyst system further comprises:
a scavenger c); and
an activator d) other than the solid support of the component a).

* * * * *